Patented May 19, 1925.

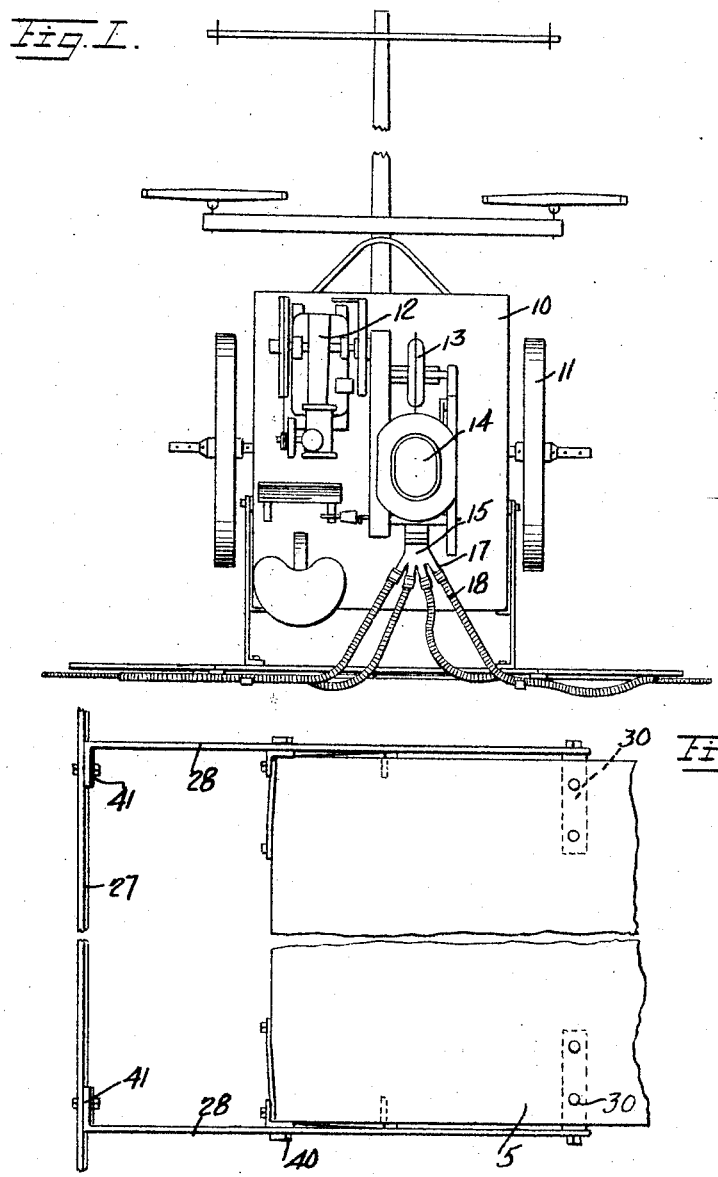

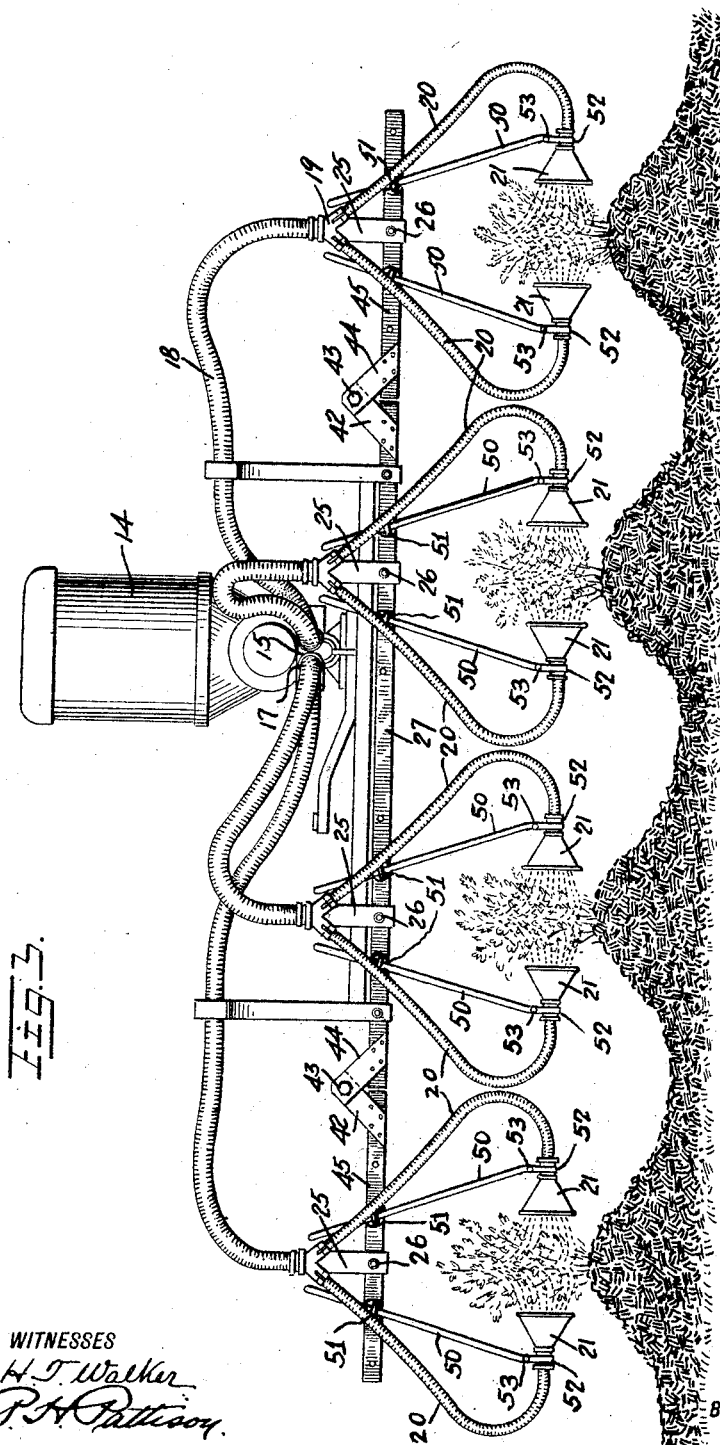

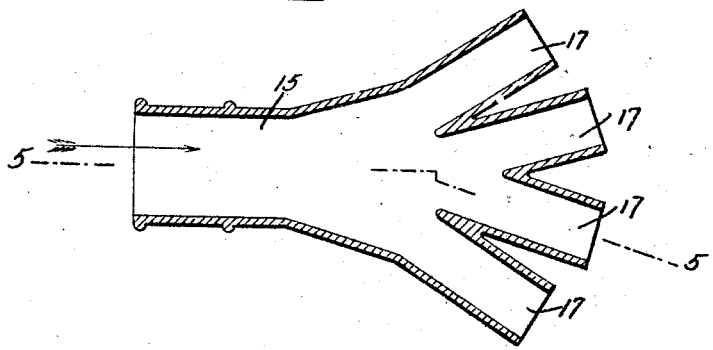
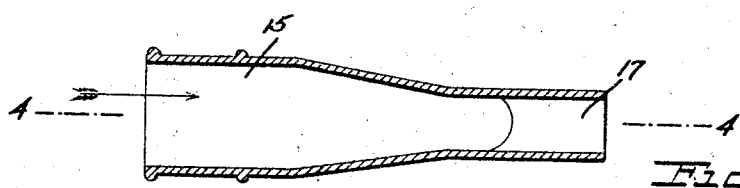
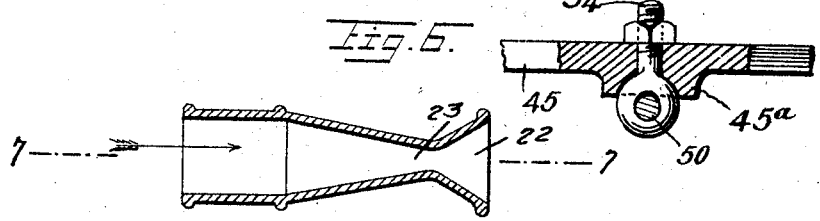
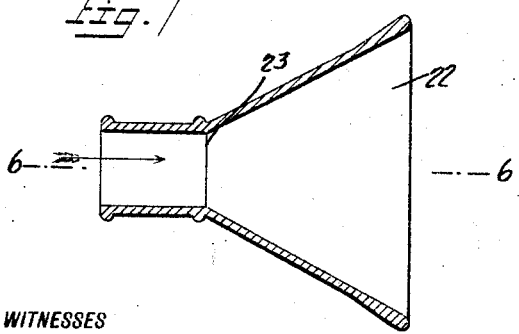

1,538,779

UNITED STATES PATENT OFFICE.

CARL G. ALLGRUNN AND EDGAR KNAPP, OF MIDDLEPORT, NEW YORK, ASSIGNORS TO NIAGARA SPRAYER CO., OF MIDDLEPORT, NEW YORK, A CORPORATION OF NEW YORK.

DUSTING MACHINE.

Application filed October 26, 1921. Serial No. 510,631.

*To all whom it may concern:*

Be it known that we, CARL G. ALLGRUNN and EDGAR KNAPP, both citizens of the United States, and residents of Middleport, in the county of Niagara and State of New York, have invented a new and Improved Dusting Machine, of which the following is a full, clear, and exact description.

The present invention relates to new and useful improvements in agricultural machines, and it pertains more particularly to treating growing crops with insecticides or the like.

It is one of the objects of the invention to provide a machine which will effectively apply insecticides and fungicides in powdered form to growing crops.

Heretofore machines for the above mentioned purpose have been constructed but so far as we are aware such machines apply the powdered material by blowing the same downwardly upon the plants, and machines operating in this manner are ineffective for the purpose in that the powder does not reach the under side of the leaves.

It is a further object of the invention to construct a machine by means of which the powder is effectively applied to all surfaces of the stems and leaves of the plants.

It is a further object of the invention to provide a machine in which the discharge nozzles may be adjusted to meet various operating conditions.

With the above and other objects in view, reference is had to the accompanying drawings, in which Figure 1 is a top plan view of a machine constructed in accordance with the present invention;

Figure 2 is a detail plan view of a portion of the machine showing the brackets for supporting the discharge nozzles, and its manner of attachment to the machine;

Fig. 3 is a rear elevation of the machine showing the manner of applying the powder to the plants;

Fig. 4 is a sectional view of the discharge from the hopper, taken on the line 4—4 of Fig. 5;

Fig. 5 is a sectional view taken on the line 5—5 of Fig. 4;

Fig. 6 is a sectional view of one of the discharge nozzles taken on the line 6—6 of Fig. 7;

Fig. 7 is a sectional view of one of the discharge nozzles taken on the line 7—7 of Fig. 6;

Fig. 8 is an elevation of the discharge end of one of the nozzles;

Fig. 9 is a detail view of the means for securing the arms, which support the nozzle carrying pipes to their supporting bars.

Referring again to the drawings and more particularly to Fig. 1, the device comprises a platform 10 mounted on wheels 11. Mounted upon the platform 10 is a motor 12, and said motor 12 operates a blower 13.

The reference character 14 designates a hopper and said hopper is provided with a discharge nozzle 15. The material is discharged from the hopper to the discharge nozzle 15 by a suitable mechanism (not shown) but forming a part of a separate application filed Oct. 15, 1921, in the name of Carl G. Allgrunn, Serial No. 510,405. In the present instance, this discharge fitting 15 is provided with four branches 17, and leading from each of these branches 17 is a flexible discharge pipe 18. As more clearly shown in Fig. 4, each of these discharge pipes 18 is provided with a two-way fitting 19, and leading from each of these two-way fittings 19 are two flexible pipes 20, upon the lower end of each of which is a nozzle 21. As more clearly shown in Figs. 6, 7 and 8, the discharge end of this nozzle is flared as indicated by the reference character 22, and said nozzle has an elongated and contracted throat portion 23. The several nozzles 21 are so positioned as to have their length presented in a vertical plane as more clearly shown in Fig. 3.

Each of the discharge pipes 18 is supported upon a rigid bracket 25, and the two central rigid brackets 25 are pivotally secured as at 26, to a rigid member 27, which in turn is secured to the machine by means of arms or the like 28, as more clearly shown in Fig. 2. These arms 28 are secured to the platform 10, of the machine by means of brackets or the like 30, and extend rearwardly and downwardly of the machine.

Secured to the rear end of the platform 10 are rests or brackets 40 in which the arms 28 are supported, and the rigid member 27 heretofore mentioned is connected to the rear end of the arms 28 as indicated by the reference character 41. Secured to each end of the rigid member 27, is a bracket member 42, and pivotally mounted thereon, as at 43, is a similar bracket 44. Each of the brackets 44 carries a projecting arm 45, and the pivotal point 43 forms the means about which the projecting arms 45 may be swung inwardly of the machine. The outer brackets 25 for supporting the outer discharge pipes 18 are carried upon these projecting arms 45 as more clearly shown in Fig. 3.

In order to support the pipes 20 in proper operative position, the nozzle 21 of each of said pipes is connected to a depending arm 50 by a member 52 encircling the nozzle and secured to the arm by a bolt 53, and the depending arms 50 are connected to their respective supports by a suitable frictional joint 51, which frictional joint not only permits of longitudinal adjustment of the arms 50 but also permits of their rocking in order that the nozzles 21 may be moved toward or away from each other as the operating conditions may require. The friction joint shown consists of an eye bolt 54 passed through the member 45 and through the eye of which the arm 50 passes. The arm 50 is clamped by the bolt into engagement with the projection 45$^a$ on the member 45 so that the arm is securely held in position. By loosening the arms of the bolt, the bolt is not only free to turn in the opening to change the angular adjustment of the arm, but the binding action on the arm is relieved and said arm is free to slide in the eye bolt to adjust it longitudinally.

The device operates in the following manner:

As the motor is started and the blower 13 supplies air under pressure to the hopper 14, the powdered material is picked up and distributed by means of the four-way fitting 15 to the several discharge pipes 18. As the material passes through the discharge pipes 18 to the two-way fittings 19, it is further passed through the pipes 20 to the nozzles 21. Owing to the disposition of the nozzles in pairs in opposition to each other, as more clearly shown in Fig. 3, it is apparent that the dust-laden air as it is projected from the nozzles, forms a counter-current and causes the dust-laden air to move upwardly through the plants in such a manner that the powdered material will be projected against the under surface of the leaves of the plant and will adhere thereto in such a manner that the under surface will be thoroughly coated as well as the upper surface of the leaves, and the stems of the plant.

When it is desired to move the machine from place to place, the two extension arms 45 are swung about their respective pivotal points 43, and the outer sets of nozzles are swung forwardly of the machine in order to reduce the transverse dimension of the machine for transportation.

While in the present instance the machine is shown as of the four row type, it is obvious that a greater or lesser number of nozzles may be employed without departing from the spirit of the invention.

We claim:

1. In a plant dusting machine, a wheeled supported platform, a receptacle on the platform, a sectional and hinged bar carried by the platform at the rear thereof, a plurality of flexible pipes leading from the receptacle, means for securing the pipes to the said bar, a pair of flexible pipes carried by each of the first named pipes and provided with nozzles at their ends, an arm secured to each of the nozzle carrying pipes adjacent the nozzles thereof, and means for securing the arms to the bar, whereby the nozzles of each pair of nozzles can be adjusted vertically and swung towards and from one another.

2. In a plant dusting machine, a movably supported platform, a bar, a pair of rigid arms carried by said bar and extending laterally of the latter, said arms straddling an end portion of the platform and being attached to the latter, other bars hinged to the first bar at the ends of the latter, two pairs of opposed nozzles carried by the fixed bar a pair of opposed nozzles carried by each of said hinged bars, said nozzles being movable vertically and swingable toward and away from each other, a source of pressure fluid supply located on said platform, and flexible fluid conducting means connecting said nozzles with said source of fluid supply.

3. A plant dusting machine, comprising a wheeled supported platform, a receptacle supported on the platform and having a discharge nozzle having four members, a transversely extending bar at the rear end of the platform, and having two upwardly projecting brackets, a bar hinged to each end of the first bar to swing upwardly or in alinement with said bar, and each having an upwardly projecting bracket, a flexible pipe secured to each member of the nozzle and each having at its end a two-way member, secured to the upper end of each bracket, a pair of flexible pipes having nozzles at their ends and secured to each member of the first named pipes, and means for securing the nozzle carrying pipes to the said bars, whereby the nozzles of each pair of nozzles can be adjusted vertically and moved toward and from one another.

CARL G. ALLGRUN.
EDGAR KNAPP.